United States Patent [19]

Lehmann et al.

[11] Patent Number: 4,869,533
[45] Date of Patent: Sep. 26, 1989

[54] FITTING OF WELDABLE THERMOPLASTIC MATERIAL

[75] Inventors: Ernesto Lehmann, Schaffhausen; Alred Thalmann, Uhwiesen, both of Switzerland

[73] Assignee: Georg Fischer AG, Schaffhausen, Switzerland

[21] Appl. No.: 85,452

[22] Filed: Aug. 13, 1987

[30] Foreign Application Priority Data

Aug. 29, 1986 [CH] Switzerland ............... 03 475/86

[51] Int. Cl.$^4$ .............................................. F16L 47/02
[52] U.S. Cl. ..................................... 285/21; 285/93; 285/423
[58] Field of Search ................. 285/93, 21, 41, 417, 285/423; 219/535, 544; 156/273.9, 274.2, 309.6, 294; 264/27, 36, 40.2, 230

[56] References Cited

U.S. PATENT DOCUMENTS

| | | | |
|---|---|---|---|
| 4,117,311 | 9/1978 | Strum | 219/544 |
| 4,362,684 | 12/1982 | Thalmann | 285/21 |
| 4,686,071 | 8/1987 | Rosenzweig | 219/535 |
| 4,703,150 | 10/1987 | Kunnecke et al. | 219/535 |
| 4,727,242 | 2/1988 | Barfield | 219/535 |

FOREIGN PATENT DOCUMENTS

| | | |
|---|---|---|
| 173174 | 3/1986 | European Pat. Off. |
| 2760064 | 9/1983 | Fed. Rep. of Germany |
| 632078 | 9/1982 | Switzerland |

Primary Examiner—Randolph A. Reese
Assistant Examiner—Anthony Knight
Attorney, Agent, or Firm—Toren, McGeady & Associates

[57] ABSTRACT

A fitting of weldable thermoplastic material for connecting pipe elements or other fittings. The connection is obtained by welding by means of at least one heating element arranged at the surfaces of the members to be welded together. At least one weld indicator defined by a hollow space in the fitting is provided. The hollow space defines a first opening at the inner surface of the fitting and a second opening at the outer surface of the fitting. The first opening is covered by the heating element and the second opening defines a portion of reduced width, the portion of reduced width defining a retaining or cooling surface facing the interior of the hollow space. The second opening serves as an outlet opening for the melt. During welding, melt is conducted into the hollow space by the generated welding pressure. The melt solidifies when it reaches the retaining and cooling surface and only a small portion of the melt is conducted through the outlet opening for indicating a problem-free welding connection.

9 Claims, 2 Drawing Sheets

FITTING OF WELDABLE THERMOPLASTIC MATERIAL

BACKGROUND OF THE INVENTION

1. Field of the Invention

The present invention relates to a fitting of weldable thermoplastic material. The fitting is used for connecting pipe elements or other fittings. The connection is obtained by welding by means of at least one heating element arranged at the surfaces of the members to be welded together. At least one weld indicator defined by a hollow space in the fitting is provided.

2. Description of the Prior Art

Fittings of thermoplastic material of the above-described type are known. These fittings are welded by means of heating elements which include an electric heating wire and are integrated in the fittings.

The heating elements are, for example, heating coils or heating mats. The structural design of the heated fitting determines the principal parameters of the welded connection, i.e., the electrical energy to be supplied within a period of time by means of a control device and the melt pressure generated during the period of energy supply. If the fitting is a closed welding sleeve, the structural design of the fitting is characterized by the inherent shrinking capability of the fitting. If the fitting is a radially mountable, saddle-shaped fitting of appropriate shape, the structural design of the fitting is characterized by the pressing force to be exerted by means of externally mountable tensioning members. In addition, to determine whether the welded connection is free of problems, devices are advantageously provided in the fittings in the area of the heating elements, the devices having become known in the art as weld indicators.

Swiss Pat. No. 632,078 discloses a fitting of the above-described type. The fitting is a sleeve used for connecting pipe elements. The indicating device for monitoring the welding is formed by a cylindrical recess starting at the outer periphery of the sleeve. The bottom of the recess is located in the vicinity of the heating elements, so that a wall member is provided between heating element and recess. This type of fitting facilitates a direct visual indication of any existing melt. However, this visual indication reacts negatively to external influences, such as, ambient temperature and wind. Under extreme circumstances, melt will flow from the joint area in an uncontrolled manner, so that it possible that no welding pressure or a welding pressure which is too small may exist at certain locations. As a result, it cannot be ensured that the welded connection is free of problems in these areas.

German Pat. No. 2,760,064 discloses a welding sleeve with a weld indicator which includes a sensor pin surrounded by a free space, the base of the pin being arranged at the bottom of the latter. An uncontrolled discharge of melt is not likely in this weld indicator. However, a direct visualization of the melt is normally not possible. This indirect indication by the shifting of the pin beyond the outer periphery of the sleeve is very unsafe due to outer influences and the like. Thus, particularly when the fittings have thick walls, a reliable indication of a problem-free welded connection is not ensured.

An improved weld indicator is disclosed in European application No. 0,173,174. This known weld indicator includes an enclosed hollow space and a piston with an indicator pin arranged in the hollow space. This weld indicator also has the disadvantage that the melt is visualized indirectly. In addition, incorrect indications may occur, for example, due to the formation of gas or vapor pressure. In addition, the shifting of the piston is dependent upon the frictional conditions thereof relative to the hollow space and, thus, also depends upon the dimensional tolerances of the piston and of the hollow space. Therefore, the indication is also unreliable and, furthermore, the indicator is complicated in its design.

It is, therefore, the primary object of the present invention to provide a fitting with a weld indicator of the above-described type, wherein the melt can be made directly visible by means of an indicator which is structurally very simple, and wherein the indicator operates in such a way that the melt cannot flow out in an uncontrolled manner.

SUMMARY OF THE INVENTION

In accordance with the present invention, the hollow space defined in the fitting defines a first opening at the inner surface of the fitting and a second opening at the outer surface of the fitting, wherein the first opening is covered by the heating element and the second opening defines a portion of reduced width, the portion of reduced width defining a retaining and cooling surface facing the interior of the hollow space. The second opening serves as an outlet opening for the melt.

The various features of novelty which characterize the invention are pointed out with particularity in the claims annexed to and forming a part of this disclosure. For a better understanding of the invention, its operating advantages and specific objects attained by its use, reference should be had to the drawings and descriptive matter in which there are illustrated and described preferred embodiments of the drawing.

DETAILED DESCRIPTION OF THE INVENTION

Figure 1:
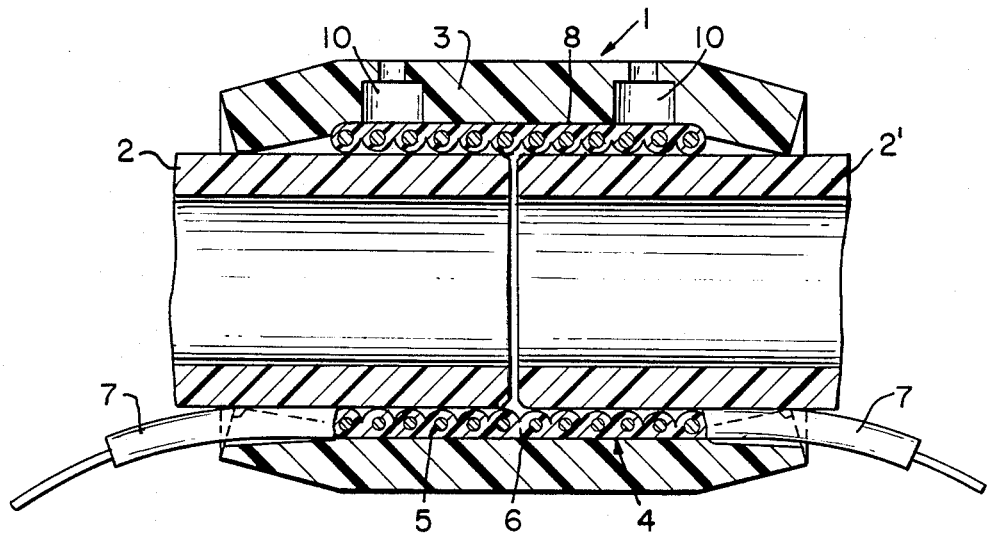
FIG. 1 is a sectional view in longitudinal direction of a fitting in accordance with the present invention, the fitting being a welding sleeve for connecting two pipes.

The fitting illustrated in FIG. 1 of the drawing is constructed as a welding sleeve generally denoted by reference numeral 1. Welding sleeve 1 serves to connect pipe elements, such as, the ends of pipes 2 and 2' of thermoplastic material. A fitting member 3 of thermoplastic material includes a heating element 4 arranged at the inner circumference forming a connecting surface 8. Heating element 4 includes a spirally wound resistance wire 5 which is provided with a jacket 6 of thermoplastic material. A compact winding is obtained by welding the individual coils together. The ends 7 of the winding extend out of the ends of the fitting member 3 for connection to a device with a current source.

The supply of heating energy is controlled in the device in such a way that the heat generated in the welding region at the connecting surface 8 ensures a problem-free welding between the fitting member 3 and the pipe ends 2, 2'. In order to obtain the welding pressure required for good welding, the fitting member 3 has a shrinkage stress or tension which is released during heating and presses fitting member 3 against pipe ends 2, 2'. Weld indicators 10 are provided at both ends of the welding region.

Figure 2:
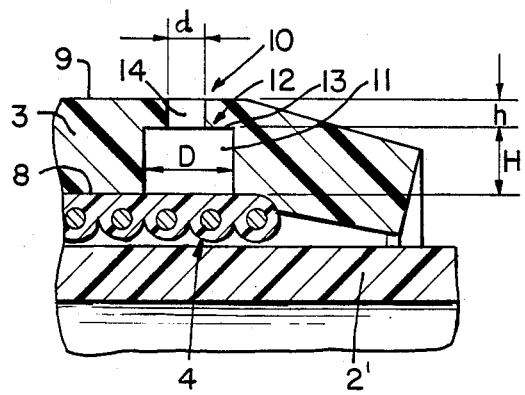
FIG. 2 is a partial sectional view, on a larger scale, of a detail of the fitting shown in FIG. 1.

As can be seen from FIG. 2 of the drawing, weld indicator 10 is formed by a hollow space 11. Hollow space 11 is formed as a cylindrical bore which is open at the fitting member 3 towards connecting surface 8 and is covered only by heating element 4 after the winding has been introduced. Toward the outer periphery 9 of the fitting member 3, hollow space 11 has a portion 12 of reduced width with a retaining and cooling surface 13 and an outlet opening 14.

Figure 3:
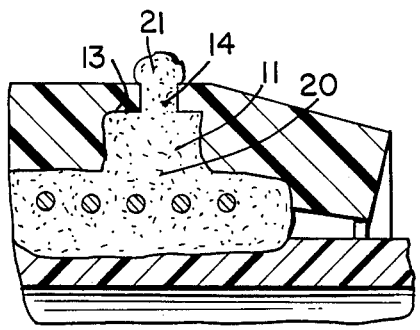
FIG. 3 shows the detail illustrated in FIG. 2, after welding has been carried out.

As illustrated in FIG. 3, when heat is generated by means of electrical current in heating element 4, the material of the jacket of the heating element 4 and of the adjacent inner portions of fitting member 3 and the outer portions of pipe ends 2, 2' are plasticized, wherein a portion of the material is forced by the resulting welding pressure into hollow space 11.

The melt 20 can uniformly rise in hollow space 11 which is indirectly heated from inside. The melt 20 rises until it reaches retaining and cooling surface 13. The material at the outer surface of melt 20 solidifies at this retaining and cooling surface 13 and only hotter materials still in the core of melt 20 can rise into outlet opening 14, where a visible plug 21 containing little material is formed at outer periphery 9.

The amount of discharged melt can be kept low by the selection of the dimensions D/H for the hollow space and d/h for the outlet opening or the portion 12 of reduced width and by the selection of the shape or surface properties of the retaining and cooling surface 13. The maximum of dimension d should be $\frac{3}{4}$ of D.

Figure 4A:
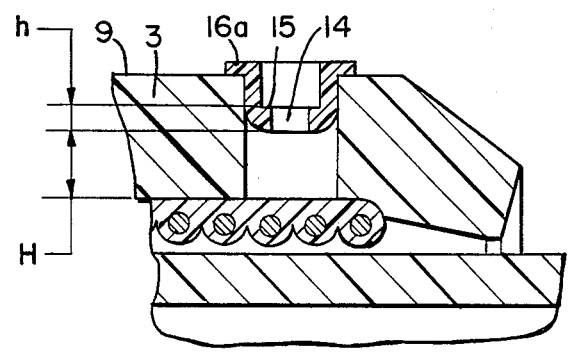
FIG. 4a and 4b are sectional views, similar to FIG. 2, of different embodiments of weld indicators.

FIG. 4a of the drawing shows a hollow space 11 whose retaining and cooling surface 13 is provided with at least one annular rib 15 for a better cooling of the melt. The portion 12 of reduced width is in this instance formed by a cover 16 which is fixedly connected to outer periphery 9. Cover 16 includes the retaining and cooling surface 13 with rib 15 and the outlet opening 14. The fixed connection can be obtained by means of welding or gluing.

Figure 4B:
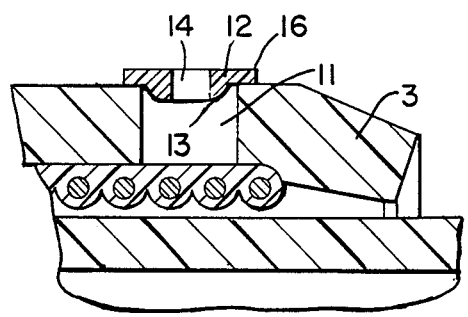

The embodiment shown in FIG. 4b is preferably used in welding sleeves 1 which have a fitting member 3 of small wall thickness. If the fitting member 3 has a greater wall thickness, the embodiment of the cover shown in FIG. 4a and indicated by reference numeral 16a is used. This cover 16a has a portion 12 of reduced width which is shifted toward the interior of hollow space 11. In this situation, the length of bore 14 defined at portion 12 is also smaller than dimension H of hollow space 11 extending to portion 12.

Figure 5:
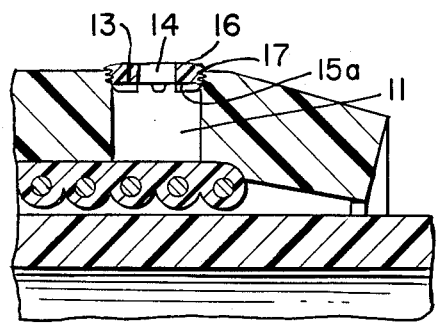
FIG. 5 shows another embodiment of the weld indicator.

In the weld indicator 10 shown in FIG. 5, the portion 12 of reduced width is also formed by a cover 16 which is rigidly connected to fitting member 3. Cover 16 is screwed from the outside into fitting member 3 by means of a thread 17. Cover 16 forms outlet opening 14. The inner end face of cover 16 forms the retaining and cooling surface 13. In this embodiment, retaining and cooling surface 13 includes radially extending ribs 15a. Cover 16 may be rigidly connected to fitting member 3 in a different manner, for example, by a press fit or by welding.

Ribs 15 or 15a shown in FIG. 5 can also be provided at the retaining and cooling surface 13 of the embodiment shown in FIG. 2.

In order to ensure that melt 20 is easily visible when it emerges, the area of the outer periphery 9 surrounding the opening 4 or the outer end face of cover 16 may have a different color than the melt.

The melt indicator described above makes possible a correct visual control of the generated melt. The manner of indication is essentially independent of outer influences, such as, ambient temperature, wind, etc. As a result, melt is indicated directly when a problem-free welding has been carried out.

The above-described weld indicator 10 can also advantageously be used in fittings which are constructed as boring pipe pieces for connecting branch lines, for example, in accordance with European application No. 0,170,844, or in fittings which are to be welded together or to other fittings with pipe elements being arranged therebetween, for example, as described in European application Nos. 0,146,775 or 0,076,460.

While specific embodiments of the invention have been shown and described in detail to illustrate the application of the inventive principles, it will be understood that the invention may be embodied otherwise without departing from such principles.

We claim:

1. A fitting of weldable thermoplastic material for connecting pipe elements or other fittings, wherein the connection is obtained by welding by means of at least one heating element arranged at the surfaces of the members to be welded together, the fitting including a weld indicator defined by a hollow space in the fitting, the fitting having a first inwardly facing surface and a second outwardly facing surface, the hollow space defining in the first surface a first opening and in the second surface a second opening in communication with the first opening, wherein the improvement comprises that the first opening is covered by the heating element and the second opening defines a portion of reduced width, the portion of reduced width defining a retaining and cooling surface facing the interior of the hollow space, the second opening serving as an outlet opening for the melt.

2. The fitting according to claim 1, wherein the outlet opening defines a radially extending axis, the retaining and cooling surface extending essentially perpendicularly to the axis of the outlet opening, the distance of the retaining and cooling surface from the second surface being smaller than from the first surface.

3. The fitting according to claim 1, wherein the length of the outlet opening depth of the hollow space extending from the first surface to the retaining and cooling surface.

4. The fitting according to claim 1, wherein the retaining and cooling surface defines circumferentially extending ribs.

5. The fitting according to claim 1, wherein the retaining and cooling surface defines radially extending ribs.

6. The fitting according to claim 1, wherein the portion of reduced width is formed by a cover rigidly connected to the fitting at the second surface.

7. The fitting according to claim 6, wherein the portion of reduced width is inwardly offset relative to the second surface.

8. The fitting according to claim 1, wherein the hollow space is defined by a bore extending perpendicularly or approximately perpendicularly to the first surface.

9. The fitting according to claim 1, wherein the second surface is provided in the vicinity of the outlet opening with a color which is different from the color of the melt.

* * * * *